Figure 1:
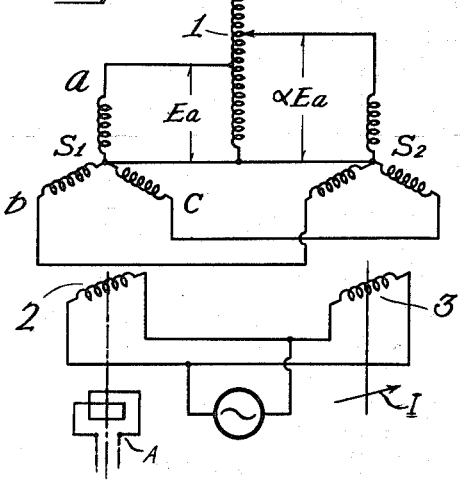

Dec. 30, 1958 SANEYUKI TAKEUCHI ET AL 2,866,969
DIRECTION FINDER
Filed March 7, 1955 2 Sheets-Sheet 1

INVENTOR
Saneyuki Takeuchi
Seihei Mii
BY Michael S. Striker
agt.

United States Patent Office 2,866,969
Patented Dec. 30, 1958

2,866,969

DIRECTION FINDER

Saneyuki Takeuchi and Seihei Mii, Tokyo, Japan, assignors to Yao Musen Kabushiki Kaisha, Tokyo, Japan, a corporation of Japan Application March 7, 1955, Serial No. 492,586

Claims priority, application Japan March 20, 1954

4 Claims. (Cl. 343—114)

The apparatus according to the present invention is particularly suitable for the compensation of the angular errors occurring in the indications of radio direction finders, for instance, the automatic direction finders of aeroplanes or ships.

In an automatic radio direction finder of an aeroplane or a ship, it is usual that the rotation of a loop antenna is transmitted to the navigator's seat by the selsyn-machine, but in this case, as is well known, the direction transmitted by the servo-indicator may be subject to an error against the direction of the incoming electromagnetic wave, such error being due to the disturbance by closed circuit, vertical leading wires and others. How to compensate completely these errors is the most important problem in the field of studies of direction finders. Indeed, it may be said that this problem is all that is important in this field of researches, and therefore if this can be solved perfectly, ideal direction finders will be available, since the other problems thereof have already been solved.

Any graphical curve of angular errors caused in a direction finder may be expanded into a Fourier's series as follows:

$$\delta = A + B \sin q + C \cos q + D \sin 2q + E \cos 2q + F \sin 3q + G \cos 3q + K \sin 4q + L \cos 4q + \ldots$$

Here, $\delta$ denotes the error, and $q$ the reading of the direction finder. Then, each coefficient represents the error of the respective harmonic; all terms including and after $B$ denote the evenly divided circular errors, and they are called semi-circular error, quadrantal error, octantal error and so on, respectively. Among these errors, the quadrantal error is most likely to occur in direction finders of this kind, and therefore this error occupies the greater part of the whole errors caused in the direction finder of an aeroplane or ship. The quadrantal error which is shown by the terms $D$ and $E$ is always accompanied with the octantal error shown by the terms $K$ and $L$. Therefore, the octantal error cannot be ignored when the quadrantal error is treated. On the other hand, the semi-circular error, which is usually caused by vertical conductors, will not be very large in its magnitude in comparison with the other errors described above. Furthermore, it has been made clear by the study of Mr. Mesny (in the work "Wireless Direction Finding" by Keen) that the error caused by horizontal conductors is correctly equal to the quadrantal error.

As has been mentioned above, since various errors, notably the quadrantal and other similar errors, occur in a direction finder, it is always necessary to provide a proper compensator for these errors in such direction finders. Nevertheless, no satisfactory methods of compensation have so far been either invented or put into practice. Meanwhile, various forms of error compensations by means of mechanical or electromagnetical methods have been resorted to but each of them has its merits and demerits. Thus no satisfactory solution for the matter is known up to now.

Among excellent mechanical means of compensations of this kind available at present, there is one adopted by Bendix Aviation Corporation, which is operated in an experimental way and is composed of a compensatory cam and twenty four screws. In Japan as well, there exist some devices improved over this apparatus but based on the same principle. However, these mechanical means are not only complicated in their construction but also troublesome in operation. On the other hand, the method adopted by Lear Company may be cited as as example of electromagnetical methods. According to this method, a correcting loop is mounted around the direction finding loop of A. D. F. (Automatic Direction Finder) on an aeroplane in such a manner that the plane of the correcting loop will coincide with the center line of the aeroplane, thereby eliminating the quadrantal error theoretically. This method, however, is necessarily accompanied by the disadvantage of attenuating the strength of the primary electric wave.

In view of these facts, we have conducted various forms of investigations and ultimately found out an excellent and practicable method; we have found that the angular transmission characteristics of a servo-transmitter is modified at will by merely changing the magnetic field of the servo-receiver in a proper functional ratio. More particularly, an electrical compensative means with the advantages of setting and adjusting the direction finder without using complicated mechanisms has been made available for practical use by means of supplying according to the invention the electric current into the servo-receiver so as to generate in it the magnetic field equivalent to the vectorial sum, which is sufficient to indicate the true angle of the magnetic field of the servo-transmitter and the appropriate correcting magnetic field. Thus we have succeeded in devising a very excellent and practical direction finder.

Figure 2:
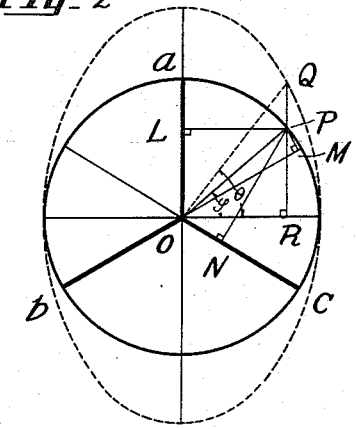
Figure 3:
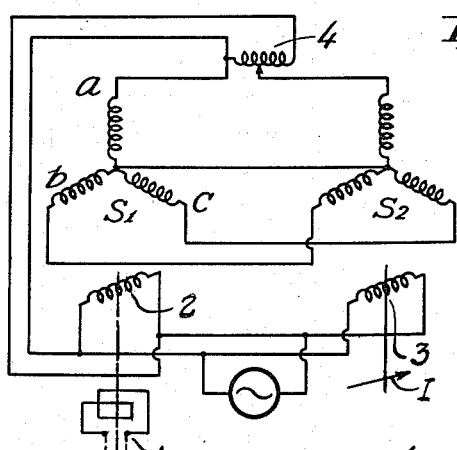
Figure 4:
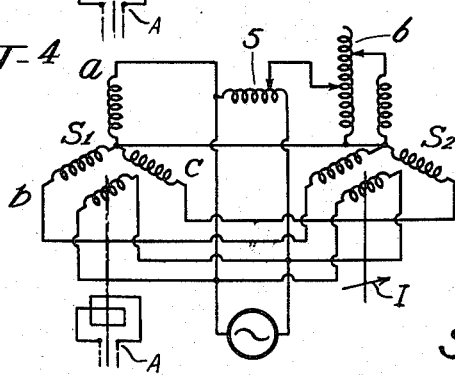
Figure 5:
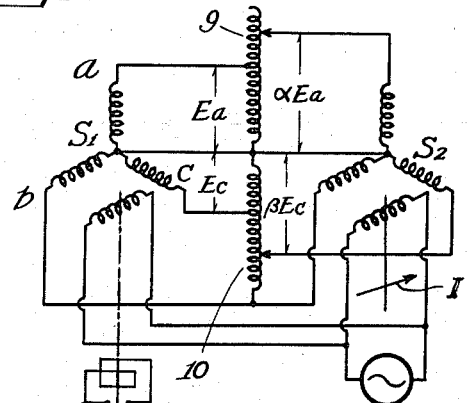
Figure 6:
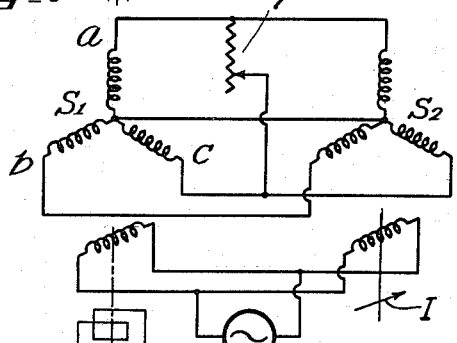
Figure 7:
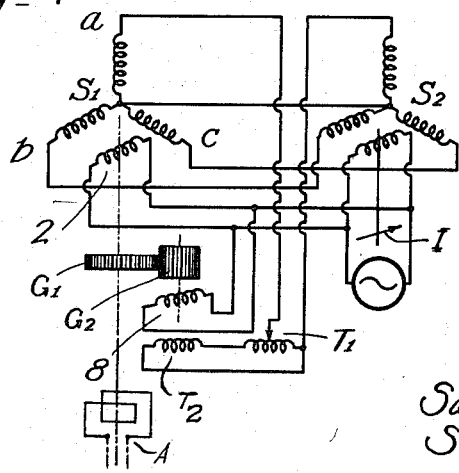

In order that the present invention may be clearly understood and readily carried into effect, the same will be described with reference to and by the aid of the accompanying drawings, in which: Fig. 1 shows the circuit diagram of a compensator for the quadrantal error; Fig. 2 the vectorial diagram of Fig. 1; Fig. 3 the circuit diagram of a compensator for the semi-circular error; Fig. 4 the circuit diagram of a compensator for both the semi-circular and the quadrantal errors for aeroplane use; Fig. 5 the circuit diagram of a compensator whereby any transmission characteristics can be obtained at will; Fig. 6 the circuit diagram of a compensator which produces the same result as the one shown in Fig. 5 will do in a special case; and Fig. 7 shows the circuit diagram of a compensator for the octantal error.

In Fig. 1, the servo-transmitter $S_1$ and the servo-receiver $S_2$, each of which consists of a three-phase stator with three Y-connected coils ($a$, $b$, $c$, $a'$, $b'$, $c'$) and a single-phase rotor with one coil 2 and 3, respectively, are mutually connected by means of electrical connections, including a neutral conductor between the neutral points of the stators, respectively, in such a manner that every coil of the transmitter is connected in parallel, respectively, with the corresponding coil of the receiver, and both rotor coils are excited by A. C. from a source Z. The auto-transformer 1 is inserted in parallel between the corresponding phase coils $a$ and $a'$ of the stators $S_1$ and $S_2$ so that the output voltage $E_a$ of the phase $a$ of the transmitter $S_1$ may be supplied to the corresponding phase $a'$ of the receiver $S_2$ after having been transformed into the voltage ($\alpha E_a$). Then, a loop antenna ($a$) is connected with the axis of the rotor 2 of the transmitter $S_1$, while an indicating needle (I) is connected with that of the rotor 3 of the receiver $S_2$.

In the vector diagram (Fig. 2) referring to the case where both the primary and secondary voltages of the auto-transformer 1 are equal, the direction of the rotor 2 of the servo-transmitter $S_1$ does not coincide with the direction of the observation angle $\theta$ and its angle $\varphi$ therefore is subject to a certain angular error; the vector of the magnetic field of the rotor 2 is represented by the vector $\overrightarrow{OP}$, and the individual components of all phases $a$, $b$ and $c$ are given by the vectors $\overrightarrow{OL}$, $\overrightarrow{OM}$ and $\overrightarrow{ON}$, respectively. In the conventional connection of servo-transmitters, these components are inevitably transmitted without any change into the servo-receiver, and so the resultant vector of the magnetic field to be obtained in the servo-receiver becomes equal to the vector $\overrightarrow{OP}$, and consequently the rotor 3 stops in the direction of this vector, which includes, as has been already mentioned above, the quadrantal error caused by the disturbance of closed circuits.

The quadrantal error referred to above has, as is universally known, the characteristic feature of the vector $\overrightarrow{OP}$ of the magnetic field of the rotor lags in the first and the third quadrants and leads in the second and the fourth quadrants in comparison with the vector $\overrightarrow{OQ}$, the angle of which is equal to the observational true angle ($\theta$).

Consequently, in order to cause the needle of the servo-receiver to coincide with the true angle $\theta$, the vector $\overrightarrow{PQ}$ which represents a magnetic field should be added to the component of the phase $a$ $\overrightarrow{OL}$ or $\overrightarrow{RP}$:

$$\overrightarrow{PQ} = (\alpha - 1)\overrightarrow{RP}$$

then, $$\overrightarrow{RQ} = \alpha \overrightarrow{RP}$$

or in another expression by $\theta$ and $\varphi$, $$\tan \theta = \alpha \tan \varphi$$

This formula suggests that it is possible to compensate perfectly the error caused by closed circuits. Therefore, the error caused by closed circuits is compensated completely by transforming the secondary voltage of the auto-transformer 1 to $\alpha$ times the primary voltage $E_a$ of it.

In Fig. 3, a compensator for semi-circular error is illustrated. This compensator comprises the servo-transmitter $S_1$ and the servo-receiver $S_2$, and each of them is composed of a three-phase stator with three Y-connected coils $a$, $b$, $c$, $a'$, $b'$, $c'$ and a single-phase rotor with one coil 2, 3, respectively. And the phase $b$ and the phase $c$ of the stator of the transmitter $S_1$ are connected in parallel respectively with the corresponding phases $b'$ and $c'$ of the stator of the receiver $S_2$. The auto-transformer 4 the primary of which is connected with the rotors 2 and 3 of the transmitter $S_1$ and the receiver $S_2$, respectively, has its secondary connected with one phase $a$ and $a'$, respectively, of the stators of the transmitter $S_1$ and of the receiver $S_2$. The rotor circuit is excitted by A. C. from a source Z.

In the operation of this compensator, $\overrightarrow{PQ}$ in Fig. 2 is constant, and the vector representing the magnetic field of the rotor of the servo-receiver leads in phase in the first and fourth quadrants and lags in phase in the second and third quadrants in comparison with the vector representing the magnetic field of the rotor of the servo-transmitter. These effects mean that the semi-circular error may be compensated by this apparatus.

In Fig. 4, an embodiment is shown as obtained by combining two apparatuses shown in Figs. 1 and 3. This compensator is quite excellent in its capacity as a compensator for an automatic direction finder of an aeroplane and it has been established by our experiments that also the octantal error can be compensated at the same time by this apparatus. Accordingly, when this apparatus is used it is unnecessary to provide another compensator particularly for the octantal error. Furthermore, this apparatus has the advantage of easy adjustability even when the aeroplane is in the air because the auto-transformers 5 and 6 which correspond to transformers 4 and 1, respectively, can be set to any desired position in an aeroplane.

In the example illustrated in Fig. 5, two auto-transformers 9 and 10 are provided in connection with a servo-machine in the same manner as in Fig. 1 except that they are connected with two phases $a$, $c$, $a'$, $c'$, thereof. In this case, any angular compensation may be performed at will by merely adjusting these transformers 9, 10 because the final compensative quantity is equal to the resultant of each compensative quantity of all phases. In a similar way, it is possible to perform desired compensations by connecting auto-transformers with each of the three phases of a servo-machine, though this is not illustrated.

In the example illustrated in Fig. 6, a variable resistance 7 is provided between the phase $a$ and the phase $c$ of the servo-machine so that both magnetic fields of the phase $a$ and of the phase $c$ in the stator of the selsyn-receiver $S_2$ may be changed equally and simultaneously. This apparatus may produce the same result as the one shown in Fig. 5 does when the transformed voltages of its two phases $a$ and $c$ are equal in potential.

In the example illustrated in Fig. 7, the servo-transmitter $S_1$ and the servo-receiver $S_2$, each of which comprises a three-phase stator with three Y-connected coils $a$, $b$, $c$, $a'$, $b'$, $c'$ and a single-phase rotor with one coil 2; 3, are connected in parallel respectively, and the rotor circuit is excited by A. C. from a source Z. A supplementary apparatus consisting of the rotor 8 and a stator $T_2$ which may be supplied by one phase of the servo-machine is provided as is shown in the drawing. In this supplementary apparatus, a voltage may be generated in its stator $T_2$ and its potential then changes in accordance with the angle of revolution of the rotor 8. This rotor 8 is connected in parallel with the rotor circuit of the servo-machine, while its stator $T_2$ with a variable component $T_1$ is connected in series between the phase $a$ of the stator of the servo-transmitter $S_1$ and the corresponding phase $a'$ of the servo-receiver $S_2$ in the same manner as the resistor 4 in the apparatus shown in Fig. 3. Furthermore, two gears $G_1$ and $G_2$ are fixed on the axes of the rotors 2 and 8 respectively, and these gears are engaged mutually so that the magnetic field of the phase $a$ of the servo-receiver $S_2$ may be changed by changing the deflection of the rotor 8. If the gear ratio between these gears is chosen as 2:1, the octantal error may be compensated by this apparatus. The working principle of this compensator may be easily understood by referring to the explanations given for Figs. 1, 2 and 3.

As has been mentioned above, the electrical apparatus according to the present invention enables us to perform a simple and accurate compensation which is not subjected to the attenuation of incoming electric waves which often occurs in the well known electromagnetical apparatus and therefore it may be said that the present invention is very advantageous from the viewpoint of practical use.

As has been noted above, the present invention is not only applicable to the error compensation of the direction finder but, by combining the means illustrated in the accompanying drawings, also adaptable as a compensation of transmitting deflection in other branches and moreover as a part of the transmission mechanism such as the remote control system.

We claim:

1. In a radio direction finding apparatus having a rotatable antenna and a remotely located rotatable direction indicator, in combination, a servo-transmitter having a plurality of first phase windings and a first neutral point connected to each of said windings, said servo-transmitter including a first rotatable member connected to said rotatable antenna so as to be rotatable therewith and cooperating with said plurality of first phase windings to produce a first electrical signal corresponding to the angular position of the rotatable antenna; a servo-receiver remotely located from said servo-transmitter and having a plurality of second phase windings each of which is respectively connected in parallel with one of said first phase windings and a second neutral point connected to each of said second phase windings, said servo-receiver having a second rotatable member connected to the rotatable direction indicator and rotatable therewith to cooperate with said plurality of second phase windings and assume a position corresponding to the position assumed by said first rotatable member; means for electrically connecting said first and second neutral points of said servo-transmitter and servo-receiver, respectively; and voltage varying means connected in circuit between at least one of said first phase windings and its respective parallel connected second phase winding for varying any electrical signal transmitted between said last-mentioned phase windings by an amount corresponding to any error introduced in said first phase windings by spurious magnetic and electrical field effects.

2. In a radio direction finding apparatus having a rotatable antenna and a remotely located rotatable direction indicator, in combination, a servo-transmitter having a plurality of Y-connected first phase windings and a first neutral point, said servo-transmitter including a first rotatable member connected to said rotatable antenna so as to be rotatable therewith and cooperating with said plurality of first phase windings to produce a first electrical signal corresponding to the angular position of the rotatable antenna; a servo-receiver remotely located from said servo-transmitter and having a plurality of Y-connected second phase windings each of which is respectively connected in parallel with one of said first phase windings and a second neutral point, said servo-receiver having a second rotatable member connected to the rotatable direction indicator and rotatable therewith to cooperate with said plurality of second phase windings and assume a position corresponding to the position assumed by said first rotatable member; means for electrically connecting said first and second neutral points of said servo-transmitter and servo-receiver, respectively; and an autotransformer connected in circuit between at least one of said first phase windings and its respective parallel connected second phase winding for varying any electrical signal transmitted between said last-mentioned phase windings by an amount corresponding to any error introduced in said first phase windings by spurious magnetic and electrical field effects.

3. In a radio direction finding apparatus having a rotatable antenna and a remotely located rotatable direction indicator, in combination, a servo-transmitter having a plurality of Y-connected first phase windings and a first neutral point, said servo-transmitter including a first rotatable member connected to said rotatable antenna so as to be rotatable therewith and cooperating with said plurality of first phase windings to produce a first electrical signal corresponding to the angular position of the rotatable antenna; a servo-receiver remotely located from said servo-transmitter and having a plurality of Y-connected second phase windings each of which is respectively connected in parallel with one of said first phase windings and a second neutral point, said servo-receiver having a second rotatable member connected to the rotatable direction indicator and rotatable therewith to cooperate with said plurality of second phase windings and assume a position corresponding to the position assumed by said first rotatable member; means for electrically connecting said first and second neutral points of said servo-transmitter and servo-receiver, respectively; and at least one autotransformer having its primary winding connected to at least one of said first phase windings and its secondary winding connected to the corresponding second phase winding for varying any electrical signal transmitted between said last-mentioned phase windings by an amount corresponding to any error introduced in said first phase winding by spurious magnetic and electrical field effects.

4. In a radio direction finding apparatus having a rotatable antenna and a remotely located rotatable direction indicator, in combination, a servo-transmitter having a plurality of Y-conneced first phase windings and a first neutral point, said servo-transmitter including a first rotatable member connected to said rotatable antenna so as to be rotatable therewith and cooperating with said plurality of first phase windings to produce a first electrical signal corresponding to the angular position of the rotatable antenna; a servo-receiver remotely located from said servo-transmitter and having a plurality of Y-connected second phase windings each of which is respectively connected in parallel with one of said first phase windings and a second neutral point, said servo-receiver having a second rotatable member connected to the rotatable direction indicator and rotatable therewith to cooperate with said plurality of second phase windings and assume a position corresponding to the position assumed by said first rotatable member; means for electrically connecting said first and second neutral points of said servo-transmitter and servo-receiver, respectively; and a variable rheostat connected in circuit between at least one of said first phase windings and its respective parallel connected second phase winding for varying any electrical signal transmitted between said last-mentioned phase windings by an amount corresponding to any error introduced in said first phase windings by spurious magnetic and electrical field effects.

References Cited in the file of this patent

UNITED STATES PATENTS 2,460,798    McCarthy _____ Feb. 8, 1949